H. DISSTON.
CIRCULAR-SAW.

No. 182,178. Patented Sept. 12, 1876.

Witnesses
Harry Howson Jr.
Harry Smith

Henry Disston
by his Attorneys
Howson and Son

UNITED STATES PATENT OFFICE.

HENRY DISSTON, OF PHILADELPHIA, PENNSYLVANIA.

IMPROVEMENT IN CIRCULAR SAWS.

Specification forming part of Letters Patent No. 182,178, dated September 12, 1876; application filed April 17, 1876.

*To all whom it may concern:*

Be it known that I, HENRY DISSTON, of Philadelphia, Pennsylvania, have invented an Improvement in Circular Saws, of which the following is a specification:

The object of my invention is to so construct a circular saw of two parts, namely, an inner portion or central disk, and outer annular portion having the teeth, that when the latter portion has been reduced in diameter by repeated gumming it can be easily removed to make way for a new annular portion, thereby restoring the saw to its original diameter, the result being economy in the consumption of material, while the saw itself is less liable to warp than one consisting of a single plate.

Figure 1:
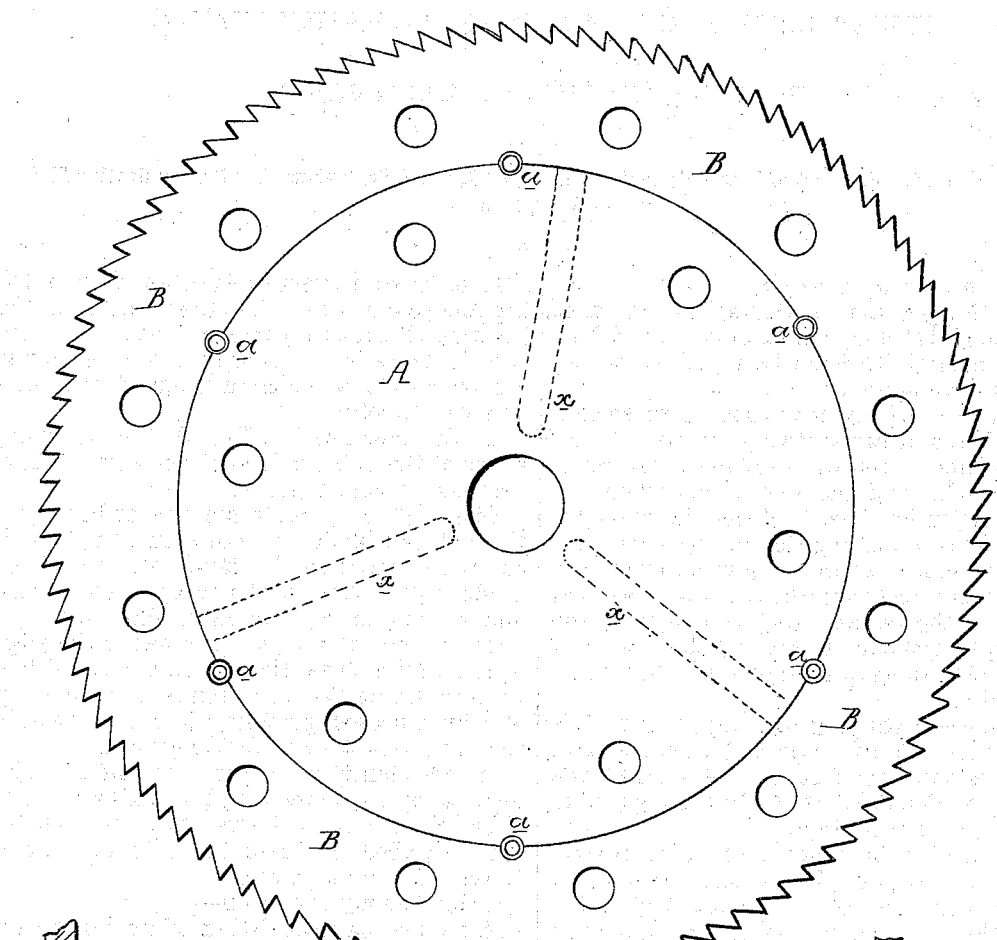
Figure 3:
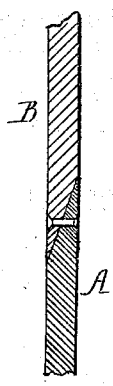
Figure 2:
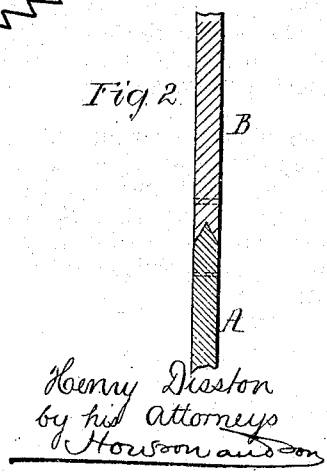

In the accompanying drawing, Figure 1 is a side view of my improved circular saw; Fig. 2, a transverse section of part of the saw-blade; Fig. 3, a section illustrating a modification of my invention.

A represents the inner portion or central disk of the saw, and B the annular portion, on the outer edge of which are formed the teeth, the inner edge having a V-shaped groove adapted to the V-shaped rib on the edge of the portion A, or the latter may have a V-shaped groove adapted to a rib on the ring.

The annular portion or ring B while expanded by heat is so adjusted to the central portion that the latter will be tightly embraced by the ring when it is cool, the V-shaped groove and rib insuring the maintenance of the two portions in their proper position laterally.

In order to prevent one portion from turning independently of the other I bore at the junction of the two parts, and at suitable intervals, holes for the reception of eyelets, rivets, or dowels *a*, which may be of comparatively soft metal.

In the modification, Fig. 3, the adjoining edges of the two portions of the saw are beveled and riveted together.

In some cases I perforate one or both portions of the blade, as shown in Fig. 1, and sometimes make in the inner portion of the blade radial slots *x*, shown by dotted lines, and extending to a point a short distance from the central opening, and out to the edge of the said inner portion of the blade. When the annular portion has been reduced in diameter by repeated gumming it can be readily removed to make way for a new one.

Independently of the economy of material insured by my invention, I have found that circular saws made of two parts, in the manner described, are less liable to warp than those made of one piece.

I claim as my invention—

A circular saw consisting of an inner central portion, A, and an outer portion, B, united, all substantially as set forth.

In testimony whereof I have signed my name to this specification in the presence of two subscribing witnesses.

HENRY DISSTON.

Witnesses:
GEO. S. GANDY,
A. H. SHOEMAKER.